United States Patent
Ma et al.

(10) Patent No.: US 9,298,215 B2
(45) Date of Patent: Mar. 29, 2016

(54) CASING COVERED BY SILICONE RUBBER AND ELECTRONIC DEVICE USING SAME

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Hung-Chun Ma, New Taipei (TW); Han-Ming Lee, New Taipei (TW); Hai-Peng Yan, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 120 days.

(21) Appl. No.: 14/135,475

(22) Filed: Dec. 19, 2013

(65) Prior Publication Data

US 2015/0085434 A1    Mar. 26, 2015

(30) Foreign Application Priority Data

Sep. 22, 2013   (CN) .................. 2013 1 04317482

(51) Int. Cl.
| | |
|---|---|
| G06F 1/16 | (2006.01) |
| B32B 7/12 | (2006.01) |
| B32B 15/08 | (2006.01) |
| B32B 25/08 | (2006.01) |
| B32B 25/20 | (2006.01) |

(52) U.S. Cl.
CPC ............... *G06F 1/1613* (2013.01); *B32B 7/12* (2013.01); *B32B 15/08* (2013.01); *B32B 25/08* (2013.01); *B32B 25/20* (2013.01); *B32B 2307/304* (2013.01); *B32B 2307/412* (2013.01); *B32B 2307/51* (2013.01); *B32B 2307/536* (2013.01); *B32B 2307/54* (2013.01); *B32B 2307/56* (2013.01); *B32B 2307/714* (2013.01); *B32B 2571/00* (2013.01); *Y10T 428/1359* (2015.01)

(58) Field of Classification Search
CPC .................................................. B29L 2009/003
USPC ...................... 361/679.01; 29/592.1; 264/241
See application file for complete search history.

(56) References Cited

U.S. PATENT DOCUMENTS

| | | | | |
|---|---|---|---|---|
| 4,526,922 | A * | 7/1985 | Pickwell et al. | 524/445 |
| 4,618,389 | A * | 10/1986 | Agodoa | 156/307.5 |
| 5,647,939 | A * | 7/1997 | Gee et al. | 156/272.6 |
| 6,409,874 | B1 * | 6/2002 | Van Der Aar et al. | 156/314 |
| 6,574,096 | B1 * | 6/2003 | Difonzo et al. | 361/679.27 |
| 6,768,654 | B2 * | 7/2004 | Arnold et al. | 361/818 |
| 8,029,906 | B2 * | 10/2011 | van Ooij et al. | 428/450 |
| 8,133,591 | B2 * | 3/2012 | Zhong et al. | 428/448 |
| 2005/0079326 | A1 * | 4/2005 | Varaprasad et al. | 428/193 |
| 2005/0208312 | A1 * | 9/2005 | Hazan et al. | 428/447 |
| 2007/0045893 | A1 * | 3/2007 | Asthana et al. | 264/173.12 |
| 2008/0069601 | A1 * | 3/2008 | Oshiba et al. | 399/286 |
| 2009/0260871 | A1 * | 10/2009 | Weber | 174/535 |
| 2010/0124663 | A1 * | 5/2010 | Furusawa et al. | 428/447 |
| 2011/0250377 | A1 * | 10/2011 | Qin | 428/99 |
| 2012/0293859 | A1 * | 11/2012 | Ikegami et al. | 359/296 |

* cited by examiner

*Primary Examiner* — Adrian S Wilson
(74) *Attorney, Agent, or Firm* — Novak Druce Connolly Bove + Quigg LLP

(57) ABSTRACT

A casing includes a main body, a silicone rubber layer, and a bonding layer. The main body is made of magnesium alloy. The bonding layer is bonded between the main body and the silicone rubber layer. The bonding layer includes about 12 to about 30 by percentage weight of silane coupling agent.

8 Claims, 2 Drawing Sheets

CASING COVERED BY SILICONE RUBBER AND ELECTRONIC DEVICE USING SAME

BACKGROUND

1. Technical Field

The present disclosure relates to casings, and particularly to a casing covered by a silicone rubber layer.

2. Description of Related Art

Electronic devices, such as notebook computers, may include casings made of metal. In order to improve a texture of the casing, an outer surface of the casing may be sprayed with paint. However, the texture of the paint sprayed on the casing is often less than satisfactory, and the paint is easily peeled off from the casing.

Therefore, it is desirable to provide a casing that can overcome the limitations described.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Embodiments of the disclosure will be described with reference to the drawings.

Figure 1:
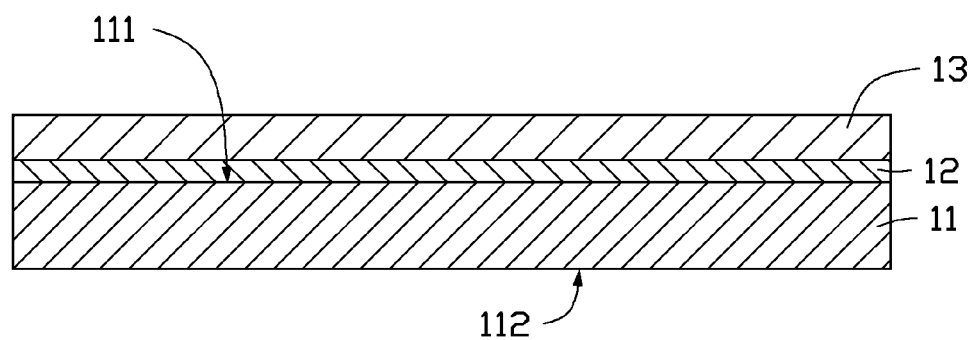
FIG. 1 is a cross-sectional view of an embodiment of a casing.
Figure 2:
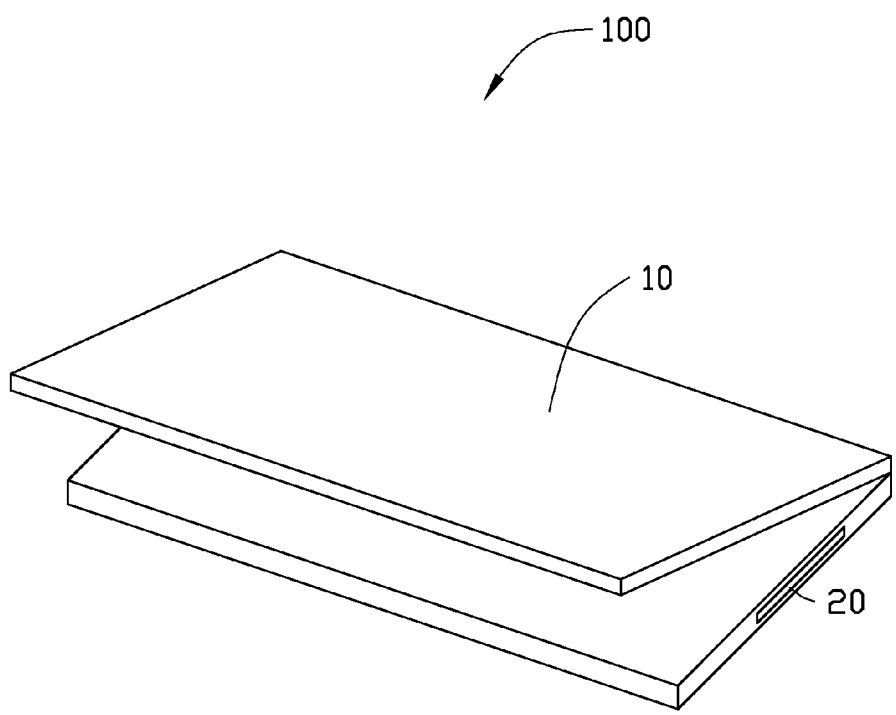
FIG. 2 shows an electronic device using the casing of FIG. 1.

FIGS. 1-2 show an embodiment of an electronic device 100. The electronic device 100 includes a casing 10 and at least one electronic element 20 received in the casing 10. In one embodiment, the electronic device 100 is a notebook computer.

The casing 10 includes a main body 11, a bonding layer 12, and a silicone rubber layer 13. The bonding layer 12 is bonded between the main body 11 and the silicone rubber layer 13.

In one embodiment, the main body 11 is made of magnesium alloy and formed by die-casting. The main body 11 includes an outer surface 111 and an inner surface 112. The magnesium alloy can be composed of, but is not limited to, mixtures of magnesium with other metals, such as aluminium, zinc, manganese, silicon, and copper. Magnesium alloy has a hexagonal lattice structure, which affects fundamental properties of the alloys. The magnesium alloy has low density, high strength, high elasticity, good shock resistance, and good corrosion resistance. The magnesium of the magnesium alloy is easily oxidized to magnesium oxide when exposed to air. Thus, an oxide layer is formed on the outer surface 111 of the main body 11. In the illustrated embodiment, the magnesium alloy is magnesium-aluminum alloy.

In one embodiment, the bonding layer 12 includes about 12 to about 30 by percentage weight (wt %) of silane coupling agent, about 26 to about 38 wt % of ethanol, about 4 to about 11 wt % of isopropanol, and about 18 to about 22 wt % of petroleum ether. The silane coupling agent reacts with the magnesium oxide in a condensation reaction. Thus, a bonding strength between the bonding layer 12 and the main body 11 is increased. The bonding layer 12 is substantially transparent, and a thickness of the bonding layer 12 is about 0.010 millimeter (mm) to about 0.015 mm.

The silicone rubber layer 13 is electrically insulative, resistant to acid erosion, resistant to light damage, resistant to fungus, and chemically stabile. The silicone rubber layer 13 maintains high strength and high elasticity in high-temperature and low-temperature environments. A Shore hardness of the silicone rubber layer 13 is about 10 to about 90, and a thickness of the silicone rubber layer 13 is about 0.5 mm to about 2.0 mm. In one embodiment, color is added to the silicone rubber layer 13 to color the silicone rubber layer 13.

In assembly, a layer of bonding glue is sprayed on the outer surface 111 of the main body 11, and the bonding layer 12 is formed on the main body 11. The silane coupling agent of the bonding layer 12 reacts with the magnesium oxide formed on the outer surface 111 in a condensation reaction. A layer of liquid silicone rubber is sprayed on the bonding layer 12 before the bonding layer 12 is cured. The silicone rubber layer 13 is formed on the bonding layer 12 after the liquid silicone rubber is cured.

Adhesion strength between the main body 11 and the silicone rubber layer 13 is greater than about 5 B.

Particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A casing, comprising:
   a main body made of magnesium alloy;
   a silicone rubber layer; and
   a bonding layer bonded between the main body and the silicone rubber layer, the bonding layer comprising about 12 to about 30 by percentage weight (wt %) of silane coupling agent;
   wherein the bonding layer comprises about 26 to about 38 wt % of ethanol, about 4 to about 11 wt % of isopropanol, and about 18 to about 22 wt % of petroleum ether.

2. The casing of claim 1, wherein a magnesium oxide is formed on an outer surface of the main body, and the silane coupling agent of the bonding layer reacts with the magnesium oxide in a condensation reaction to bond the main body and the silicone rubber layer together.

3. The casing of claim 1, wherein a Shore hardness of the silicone rubber layer is about 10 to about 90, and a thickness of the silicone rubber layer is about 0.5 mm to about 2.0 mm.

4. The casing of claim 1, wherein the bonding layer is a transparent layer, and a thickness of the bonding layer is about 0.010 mm to about 0.015 mm.

5. An electronic device, comprising:
   a casing, comprising:
   a main body made of magnesium alloy;
   a silicone rubber layer; and
   a bonding layer bonded between the main body and the silicone rubber layer, the bonding layer comprising about 12 to about 30 by percentage weight (wt %) of silane coupling agent; and
   at least one electronic element received in the casing;
   wherein the bonding layer comprises about 26 to about 38 wt % of ethanol, about 4 to about 11 wt % of isopropanol, and about 18 to about 22 wt % of petroleum ether.

6. The electronic device of claim 5, wherein a magnesium oxide is formed on an outer surface of the main body, and the silane coupling agent of the bonding layer reacts with the magnesium oxide in a condensation reaction to bond the main body and the silicone rubber layer together.

7. The electronic device of claim 5, wherein a Shore hardness of the silicone rubber layer is about 10 to about 90, and a thickness of the silicone rubber layer is about 0.5 mm to about 2.0 mm.

8. The electronic device of claim 5, wherein the bonding layer is a transparent layer, and a thickness of the bonding layer is about 0.010 mm to about 0.015 mm.

* * * * *